(12) United States Patent
Bernardes Vieira Junior

(10) Patent No.: US 10,569,519 B2
(45) Date of Patent: Feb. 25, 2020

(54) LOW COST SURFACE COVERING TILES AND THE PROCESS FOR THEIR MANUFACTURE

(71) Applicant: TARKETT GDL S.A., Lentzweiler (LU)

(72) Inventor: Sérgio Bernardes Vieira Junior, Jacarei (BR)

(73) Assignee: TARKETT GDL S.A., Lentzweiler (LU)

( * ) Notice: Subject to any disclaimer, the term of this patent is extended or adjusted under 35 U.S.C. 154(b) by 283 days.

(21) Appl. No.: 15/503,893

(22) PCT Filed: Jul. 8, 2015

(86) PCT No.: PCT/EP2015/065601
§ 371 (c)(1),
(2) Date: Feb. 14, 2017

(87) PCT Pub. No.: WO2016/008783
PCT Pub. Date: Jan. 21, 2016

(65) Prior Publication Data
US 2017/0232724 A1 Aug. 17, 2017

(30) Foreign Application Priority Data

Jul. 15, 2014 (EP) ..................................... 14177077
Jun. 18, 2015 (EP) ..................................... 15172710

(51) Int. Cl.
| | | |
|---|---|---|
| *B32B 38/06* | (2006.01) | |
| *B44C 1/24* | (2006.01) | |
| *B44C 5/04* | (2006.01) | |
| *B32B 7/02* | (2019.01) | |
| *B32B 27/30* | (2006.01) | |
| *B32B 27/32* | (2006.01) | |
| *E04F 15/10* | (2006.01) | |
| *B32B 27/36* | (2006.01) | |
| *B32B 38/00* | (2006.01) | |

(52) U.S. Cl.
CPC ............... *B32B 38/06* (2013.01); *B32B 7/02* (2013.01); *B32B 27/304* (2013.01); *B32B 27/306* (2013.01); *B32B 27/32* (2013.01); *B32B 27/36* (2013.01); *B32B 38/145* (2013.01); *B44C 1/24* (2013.01); *B44C 5/04* (2013.01); *E04F 15/105* (2013.01); *E04F 15/107* (2013.01); *B32B 2327/06* (2013.01); *B32B 2367/00* (2013.01); *B32B 2419/04* (2013.01); *B32B 2451/00* (2013.01); *B32B 2471/00* (2013.01)

(58) Field of Classification Search
CPC . B32B 38/06; B32B 2471/00; B32B 2419/04; B32B 2327/06; B32B 27/304; B32B 27/36; B32B 2367/00; E04F 15/107
USPC .................................................... 156/61, 209
See application file for complete search history.

(56) References Cited

U.S. PATENT DOCUMENTS 6,933,043 B1 * 8/2005 Son ......................... B32B 27/08
428/215

FOREIGN PATENT DOCUMENTS

| EP | 2727725 | 5/2014 |
|---|---|---|
| JP | H04128042 | 4/1992 |
| JP | 2009018439 | 1/2009 |
| WO | WO-8701334 | 3/1987 |
| WO | WO-03057458 | 7/2003 |

OTHER PUBLICATIONS

Database WPI Week 200917—Thomson Scientific, London, GB; AN 2009-E38350 XP002745058,—& JP 2009 018439 A (Toppan Cosmo KK) Jan. 29, 2009 (Jan. 29, 2009) * abstract * * paragraph [0013] *.
Database WPI Week 199224 Thomson Scientific, London, GB; AN 1992-196546 XP002745057, & JP H04 128042 A (Dainippon Printing Co Ltd) Apr. 28, 1992(Apr. 28, 1992) * abstract *.
European Search Report for EP 15172710, completed Sep. 25, 2015.
International Search Report for PCT/EP2015/065601, dated Oct. 12, 2015.

* cited by examiner

*Primary Examiner* — Carson Gross
(74) *Attorney, Agent, or Firm* — B. Aaron Schulman, Esq.; Stites & Harbison, PLLC

(57) ABSTRACT

The invention concerns a process for the manufacture of surface covering tile (SCT) comprising the steps of: (i) providing a surface layer comprising a film having a melting point of above 200° C.; (ii) printing a decorative pattern on the back side of the surface layer; (iii) providing a substrate layer comprising a polymer and a filler; (iv) bonding the back side of the surface layer onto the substrate layer and embossing the upper side of the surface layer in a hot press at a temperature and a pressure suitable for deforming the substrate layer. The invention also concerns a grained SCT comprising: a substrate layer comprising a polymer and a filler; and a surface layer comprising a film having a melting point of above 200° C., wherein the upper side of said surface layer is embossed and the back side is printed with an ink.

10 Claims, No Drawings

LOW COST SURFACE COVERING TILES AND THE PROCESS FOR THEIR MANUFACTURE

TECHNICAL FIELD

The present invention concerns the field of the manufacture of flooring, notably surface covering tiles (SCT). More specifically, it refers to a process for the manufacture of SCT with superior aesthetics at a reduced cost.

BACKGROUND ART

Since a few years, the market of the SCT, for instance LVT (luxury vinyl tiles) is literally booming. SCT are now widely used in residential, commercial and institutional applications. In particular in residential applications, the consumers have a large choice of SCT commercially available. The cost combined with the decorative effects, the durability and the ease of installation are highly considered by the consumers for making their choice. Thus, the consumers are demanding the best value for money and pay special attention to their visual appearance.

SCT, for instance LVT, generally comprise at least three layers such as a substrate layer, a decorative layer and a surface layer.

These superposed layers are usually treated, notably by printing, coating and/or embossing techniques, in order to create a homogeneous and realistic decorative pattern of natural materials.

The patent application WO 03/057458 discloses tiles having a realistic appearance which comprise a substrate, a foamed and optionally chemically embossed plastic layer, at least one ink printed on the plastic layer, a cured and embossed coating overlaying the printed surface of the foamed plastic layer and eventually a mechanically embossed top coat wear layer comprising polyurethane. The cured coating is mechanically or mechanically and chemically embossed.

However, the production of such tiles comprises numerous different steps and their cost is thus rather high.

The patent application EP 2 727 725 in the name of the Applicant proposes a low cost surface covering which comprises a substrate layer comprising polyvinyl chloride (PVC) and a filler, and wherein the surface layer comprises a polyethylene terephthalate (PET) film that is printed on the back side and coated with a primer dispersion.

Polyethylene terephthalate (PET) is a cost-effective material for surface layers, and shows good transparency, durability and printability. Nevertheless, the embossing of PET films and more generally, the embossing of costless films having a melting point of around or of above 200° C., in order to obtain a surface layer having a realistic grained texture such as the one of the natural materials and/or the joints used for flooring, is very difficult. This is due in particular to the fact that the melting temperature of these films, such the PET or a polyamide film, of above or of around 200° C., is much higher than the melting temperature of most polymers used for the substrate. Substrates based on PVC for instance are generally deteriorated when exposed to temperatures above 180° C.

There is a now a need for manufacturing a SCT having superior aesthetics at a reduced cost.

TECHNICAL PROBLEM

The present invention aims to provide a process for the manufacture of low cost SCT with superior aesthetics. More specifically, it aims to provide such a process for the manufacture which uses low cost materials and a reduced number of manufacturing steps. The present invention further provides for low cost SCT thus manufactured.

SOLUTION TO PROBLEM

According to the most general definition, the above technical problem may be solved according to the invention when the embossing of the surface layer comprising a film having a melting point of above 200° C., preferably this film is a PET or polyamide film, possibly a biaxial oriented film, is carried out in a hot press, at a temperature below 200° C.

Indeed, it was discovered surprisingly that using a hot press and suitable pressure and temperature, the SCT, with a surface layer comprising a film having a melting point of above 200° C., preferably this film is a PET or polyamide film, possibly a biaxial oriented film, could be embossed at a temperature compatible with the polymer of the underlying substrate layer, for instance PVC, merely by deforming the underlying substrate layer yielding SCT, with a superior touch and aspect, notably a fine graining and a satin finish.

Without willing to be bound to theory, the inventors consider at this point that the superior surface aspect of the SCT thus manufactured results from the fact that heat transfer in the hot press can be sufficient to soften the underlying substrate layer even at a rather low temperature, and that said softened substrate layer is then deformed under the pressure applied, yielding a SCT where the surface of the film having a melting point of above 200° C., preferably this film is a PET or polyamide film, possibly a biaxial oriented film, is embossed through the underlying deformed substrate layer rather than through softening.

The process of the invention thus provides for low cost SCT where a single surface layer combines the function of a wear layer and that of a decor layer, which may be manufactured at a competitive price and still show a sophisticated aspect and feel, and thus exhibit superior aesthetics.

SUMMARY OF INVENTION

According to a first aspect, the invention is directed to a process for the manufacture of a SCT, comprising the steps of:
(i) providing a surface layer comprising a film having a melting point of above 200° C.;
(ii) printing a decorative pattern on the back side of the surface layer;
(iii) providing a substrate layer comprising a polymer and a filler;
(iv) bonding the back side of the surface layer onto the substrate layer and embossing the upper side of the surface layer in a hot press at a temperature and a pressure suitable for deforming the substrate layer.

Preferably, the step (iv) is achieved at a temperature above the softening point but below the melting point of the polymer in the substrate layer.

Advantageously, the step (iv) is achieved by applying a temperature of from 100 to 120° C. and a pressure of from 18 to 24 kgf/cm$^2$.

Preferably, the step (iv) is carried out during a time which is comprised of from 18 to 23 minutes.

Preferably, the substrate layer comprises a polymer chosen among polyvinyl chloride, polyolefin, ethyl-vinyl acetate, polyvinyl butyrate, copolymer of vinyl chloride and vinyl acetate, their copolymer or a mixture thereof.

Preferably, the film further comprises a backing layer having a grained thickness of from 50 to 1000 μm, notably a backing layer made of copolyester.

Preferably, the film provided in step (i) has a thickness of from 5 to 100 μm.

Preferably, the substrate layer provided in step (iii) has a thickness of from 0.1 to 10 mm, preferably from 0.5 to 10 mm.

Preferably, the substrate layer provided in step (iii) comprises 50 to 90 wt. % of filler and 10 to 50 wt. % of polymer.

According to a second aspect of the invention, the invention is also directed to a grained SCT comprising:
a substrate layer comprising a polymer and a filler; and
a surface layer comprising a film having a melting point of above 200° C., wherein the upper side of said surface layer is embossed and the back side is printed with an ink.

Preferably, the substrate layer comprises 50 to 90 wt. % of filler and 10 to 50 wt. % of polymer.

Preferably, the film further comprises a backing layer having a grained thickness of from 50 to 1000 μm, notably a backing layer made of copolyester.

According to a third aspect, the invention concerns a SCT obtainable by implementing the process as above detailed.

According to a fourth aspect, the invention also concerns the use of SCT according to the invention for the manufacture of a floor by assembling click SCT via a connecting system.

DETAILED DESCRIPTION

The present invention is directed to a process for the manufacture of a SCT having superior aesthetics which may be implemented at a reduced cost, notably by using low cost materials able to be embossed and deformed, and by reducing the numbers of steps.

According to the first aspect of the invention, the process for the manufacture of a SCT, comprises the steps of:
(i) providing a surface layer comprising a film having a melting point of above 200° C.;
(ii) printing a decorative pattern on the back side of the surface layer;
(iii) providing a substrate layer comprising a polymer and a filler;
(iv) bonding the back side of the surface layer onto the substrate layer and embossing the upper side of the surface layer in a hot press at a temperature and a pressure suitable for deforming the substrate layer.

Within the present invention, the term "SCT" refers to a group consisting of a luxury vinyl tile (LVT), a vinyl composition tile (VCT) and a solid vinyl tile (SVT), preferably to a LVT. There are two types of SCT, those which are assembled to produce a floor by a click lock system, also called click SCT and those which are assembled to produce a floor by fitting each tile together via a tongue and groove system.

Step (i) of the above process may be carried out using a commercially available or manufactured film having a melting point of above 200° C.

The term "film", as used herein, refers to a polyamide or a polyethylene terephthalate (PET) film, preferably a polyethylene terephthalate film. The film according to the invention could possibly be a biaxial oriented film.

Advantageously, the film provided in step (i) has a thickness of from 5 to 30, in particular 10 to 15 μm.

For instance, the PET film may be purchased or prepared from PET pellets which are commercially available. It is generally not required to add any further additives to the PET pellets.

For instance, the PET film has a melting point of around 260° C.

Preferably, the surface layer comprises further to the film a backing layer attached on the back of the film. A backing layer made of copolyester is particularly preferred. Advantageously, the film may be coextruded with the copolyester The thickness of the surface layer may vary largely, but is lower than the thickness of the substrate layer. Generally, the surface layer has a thickness of from 5 to 100 μm.

Step (ii) of the process according to the invention may be carried out by any conventional process known in the art, such a gravure printing.

The decorative pattern is generally printed onto the back surface of the film, such as a PET or a polyamide film, or onto the backing layer. Thereby, the film serves as a carrier for the decorative pattern and, absent a backing layer, also as a wear layer. The decorative pattern printed on the back side of the surface layer thus appears more homogeneous when viewed from above, without requiring a specific coating step. The ink implemented in step (ii) allows improving the adhesion of the film, such as a PET or a polyamide film or the backing layer to the substrate layer, even at the ranges of temperature and pressure implemented in step (iv).

Preferably, the ink is applied by printing in a continuous or discontinuous manner on the back side of the surface layer.

Preferably, the film having a melting point of above 200° C. is printed in step (ii) with 15 to 40 g/m² of the ink.

Advantageously, the back side of the surface layer is printed with at least two inks having a different color.

The ink is advantageously an adhesive ink, notably comprising:
an oxidized polyolefin wax emulsified in water;
at least one pigment; and
one or more agents chosen from pH adjusting agents, wetting agents, dispersants, defoaming agents, and viscosity agents.

Different inks may be used within the present invention, for instance all technical features concerning the ink formulation disclosed in the patent application EP 1 995 057, which is incorporated herein by reference.

Preferably, the step (ii) further comprises the coating of the printed surface layer with the primer dispersion. For instance, the primer dispersion comprises polyvinyl chloride, pigment, and one or more agents chosen from pH adjusting agents, wetting agents, dispersants, defoaming agents, and viscosity agents.

Advantageously, the substrate layer preferably comprises 65 to 85 and more specifically 70 to 80 wt. % of filler. Furthermore, the substrate layer preferably comprises 20 to 35 and more specifically 25 to 30 wt. % of polymer.

Within the present invention, the term "filler" designates an inert compound, notably mineral compound. The chemical nature and particle size of the filler is not specifically limited within the present invention. However; most often fillers are chosen among calcium carbonate, talc, wollatonite and silica.

Advantageously, the polymer is a polyvinyl chloride, notably a recycled polyvinyl chloride (PVC). For example, the recycled PVC is commercially available notably in granulated or in powder form. Both forms are convenient for the substrate layer.

As certain polymer such as PVC, already comprises additives such as plasticizers, it is generally not required to add any specific further additive. However, it may be indicated in specific cases to further add stabilizers, fillers, processing aids, to the formulation.

Advantageously, the polymer is a copolymer of polyvinyl chloride and vinyl acetate.

However, notably for non-chlorine products, it may be preferred to use non chlorine polymers such as a polyolefin, ethyl-vinyl acetate, polyvinyl butyrate, their copolymer or a mixture thereof.

The thickness of the substrate layer may vary largely. However, so as to produce low cost SCT with satisfying properties, and low manufacture cost, it is preferred that the substrate layer has a thickness of from 1 to 3 mm.

Alternatively, it is preferred for producing a click SCT, that the substrate layer has a thickness of from 3 to 10 mm.

The manufacture of such substrate layers is well-known in the art.

Step (iv) of the process of the invention may be carried out in any conventional hot press available on the market.

Preferably, the process further comprises a step (v) of cooling the SCT previously obtained in step (iv). The cooling of the SCT is made successively after step (iv) in a cold press at a temperature and a pressure suitable for consolidating the SCT obtained in step (iv). Preferably, the pressure during consolidation is the atmospheric pressure.

"Consolidating" means that the SCT is cooled below the transition glass temperature of the polymers, such as PET or PVC, constituting its layers for avoiding the withdrawal of said layers and for obtaining SCT with a dimensional stability and with superior aesthetics.

Advantageously, the step (v) is achieved by applying a temperature from 40 to 60° C.

Advantageously, the step (v) is carried out during a time which is comprised from 6 to 11 minutes.

Preferably, the process further comprises a step (vi) of dimensional stability treating the SCT previously obtained at step (v).

[Low Cost SCT]

The present invention is also directed to a grained SCT with superior aesthetics which may be manufactured at a reduced cost.

According to a second aspect of the invention, the grained SCT comprises a substrate layer comprising a polymer and a filler, and a surface layer comprising a film having a melting point of above 200° C., where the upper side, i.e. the film, for instance the PET or a polyamide film, of said surface layer is embossed and the back side is printed with an ink.

Advantageously, the SCT has a fine grained surface and a satin finish.

All the technical features encompassing the preferred and the advantageous one and, alternative technical features for the substrate layer, the polymer, the filler, the surface layer, the film, the ink and the steps (i) to (vi) disclosed in the process according to the invention could be applied to the grained SCT.

According to a third aspect, the invention is directed to a SCT obtainable by implementing the process as above detailed.

[Use]

According to a fourth aspect, the invention is directed to the use of low cost SCT according to the invention for the manufacture of a floor by assembling click SCT via a connecting system.

EXAMPLES

Example 1

Preparation of the Ink
Preparation of the Ink A

In suitable container equipped with an appropriate mixer, the components indicated in the table 1 below were introduced and thoroughly mixed at room temperature.

The stable white ink A obtained is ready for use.
Preparation of the Ink B

In suitable container equipped with an appropriate mixer, the components indicated in the table 1 below were introduced and thoroughly mixed at room temperature.

The stable white ink B obtained is ready for use.

TABLE 1

Composition of the ink

| Component | | Ink A | Ink B |
|---|---|---|---|
| Product | Function | [wt. %] | [wt. %] |
| Environ ® 839 | Acrylic polymer | 6.319 | 6.327 |
|  | Water | 5.495 | 5.502 |
| AMP90 | neutralisation agent | 0.189 | 0.189 |
| TBEP from Clarian | Wetting agent | 1.904 | 1.907 |
| Tego Dispers 650 | Dispersant | 0.014 | 0.014 |
| Foamaster 50 0.4% | Defoaming agent | 0.626 | 0 |
| Tego foamex 842 | Defoaming agent | 0 | 0.499 |
| Vycar 351 | PVC emulsion | 26.425 | 26.459 |
| Pevikon DP1510 | PVC resin | 10.649 | 10.663 |
| Water |  | 18.805 | 18.829 |
| Nopco DSX 1514 | Viscosity agent | 0.395 | 0.395 |
| Tronox CR-813 | Pigment | 29.178 | 29.215 |
| Total |  | 100 | 100 |

Example 2

Preparation of SCT

A surface covering tile (SCT) is manufactured as follows.

A substrate layer sheet based on copolymer PVC and vinyl acetate is prepared by kneading in a rolling mill 0.79 kg/m² of recycled PVC and 12.67 kg/m² weight parts of calcium carbonate at 160° C. to 190° C., and rolling to a thickness of 1.90 mm.

A surface layer sheet is prepared by printing a decorative pattern on the back of a PET film provided with a copolyester backing (Lumiror 10.91 from Torray) having a total thickness of 12 μm using a gravure printing method. Subsequently, the back side of the printed PET film is coated with 25 g/m² of the ink A and dried in an oven.

The SCT is assembled in a hot press by bonding together the surface layer sheet on top of the substrate layer sheet and by embossing the surface layer sheet by applying a pressure of 16 kgf/cm² and a temperature of 120° C. during 10 minutes. Subsequently, the assembled tile is cooled down and maintained at a temperature of 55° C. during 8 minutes.

Example 3

Preparation of SCT

A substrate layer sheet based on recycled PVC is prepared by kneading in a rolling mill 0.48 kg/m² of recycled PVC, 0.22 kg/m² of PVC copolymer virgin and 2.02 kg/m² of calcium carbonate at 160° C. to 190° C., and rolling to a thickness of 0.5 mm.

A surface layer sheet is prepared by printing a decorative pattern on the back of a PET film provided with a copolyester backing (Lumiror 10.91 from Torray) having a total thickness of 12 μm using a gravure printing method. Subsequently, the back side of the printed PET film is coated with 25 g/m$^2$ of the ink B and dried in an oven.

The SCT is assembled in a hot press by bonding together the surface layer sheet on top of the substrate layer sheet and by embossing the surface layer sheet by applying a pressure of 16 kgf/cm$^2$ and a temperature of 120° C. during 10 minutes. Subsequently, the assembled tile is cooled down and maintained at a temperature of 55° C. during 8 minutes.

The SCT prepared in examples 2 and 3 showed very satisfactory properties in terms of cohesion of the layers: the compliance of the SCT with NF EN 431 has been verified and shows a resistance of 50N/50 mm.

Accordingly, the process of the invention allows the manufacture of surface covering tiles (SCT) in a single step in a hot press. The SCT obtained have superior aesthetics, notably a perfect visual appearance.

The invention claimed is:

1. A process for the manufacture of a surface covering tile (SCT) comprising:
   (i) providing a surface layer comprising a back side and an upper side, and comprising a film having a melting point of above 200° C.;
   (ii) printing a decorative pattern on the back side of the surface layer;
   (iii) providing a substrate layer comprising a polymer and a filler; and
   (iv) bonding the back side of the surface layer onto the substrate layer and embossing the upper side of the surface layer in a hot press at a temperature and a pressure suitable for deforming the substrate layer.

2. The process according to claim 1, wherein (iv) is achieved at a temperature above the softening point but below the melting point of the polymer in the substrate layer.

3. The process according to claim 1, wherein (iv) is achieved by applying a temperature of from 100 to 120° C. and a pressure of from 18 to 24 kgf/cm$^2$.

4. The process according to claim 1, wherein (iv) is carried out during a time which is comprised of from 18 to 23 minutes.

5. The process according to claim 1, wherein the polymer is selected from the group consisting of polyvinyl chloride, polyolefin, ethyl-vinyl acetate, polyvinyl butyrate, a copolymer of polyvinyl chloride and vinyl acetate, and their copolymers or mixtures thereof.

6. The process according to claim 1, wherein the film further comprises a backing layer having a grained thickness of from 50 to 1000 μm.

7. The process according to claim 1, wherein the film provided in (i) has a thickness of from 5 to 100 μm.

8. The process according to claim 1, wherein the substrate layer comprises 50 to 90 wt. % of filler and 10 to 50 wt. % of polymer.

9. The process according to claim 1, wherein the substrate layer provided in (iii) has a thickness of from 0.1 to 10 mm.

10. The process of claim 1, wherein the substrate layer provided in (iii) has a thickness of from 0.5 to 10 mm.

* * * * *